Nov. 28, 1939.  F. C. BEST  2,181,649
CLUTCH MECHANISM
Filed Nov. 20, 1936  2 Sheets-Sheet 1

Inventor
Frank C. Best,
By
Watson, Coit, Morse & Grindle
Attorneys

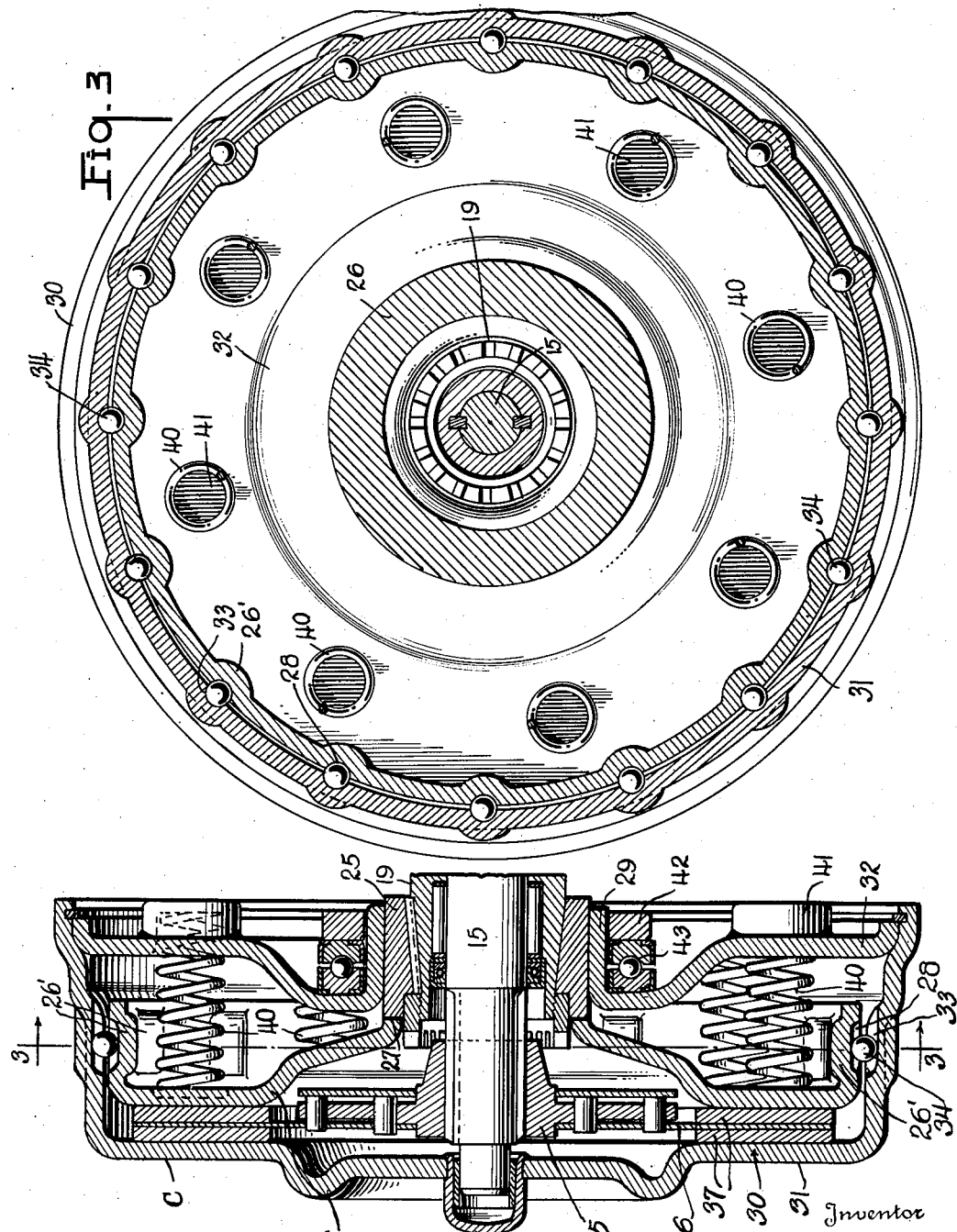

Patented Nov. 28, 1939

2,181,649

UNITED STATES PATENT OFFICE 2,181,649

CLUTCH MECHANISM

Frank C. Best, Detroit, Mich., assignor to Packard Motor Car Company, Detroit, Mich., a corporation of Michigan Application November 20, 1936, Serial No. 111,953

9 Claims. (Cl. 192—68)

The present invention relates to clutch mechanisms and particularly to clutch mechanisms of the type primarily designed and intended for use in motor vehicle power plants.

Heretofore many different types of clutch mechanisms have been designed and placed in use, certain of such mechanisms being intended for utilization wherever it is necessary to provide means for separably connecting driving and driven shafts and others being primarily intended for incorporation in certain specific power plant installations. The present clutch is of the latter type, and one purpose of the invention is to provide a clutch mechanism which not only finds its greatest field of usefulness as an element of a motor vehicle power plant, but is particularly suitable when used as an element of a motor vehicle power plant of a specific type, i. e., a power plant in which the prime mover, such as an internal combustion engine, is closely associated with an axle to be driven, being preferably placed just above such axle and operatively connected thereto by means of gearing and a transmission mechanism, the drive also passing through clutch means whereby the driving connection may be established or interrupted as desired.

It is of course a primary purpose, in so organizing and arranging a power plant, to render the same as compact as possible so that, when positioned either at the front end or at the rear end of a motor vehicle, the greatest possible body space is made available for the accommodation of either passengers or lading. Any clutch mechanism made use of in combination with the other elements of such a power plant should likewise be not only compact in itself but should be of such character as to be readily combinable with the other elements of the power plant and, when so combined, the plant as a whole occupies a minimum space. In a power plant in which the driven axle and transmission are both located beneath the engine it is found that the necessary clutch can most conveniently be positioned in axial alignment with the transmission gearing main shaft, one of the clutch elements being fixed upon this shaft and the second being fixed upon a sleeve encircling this shaft which sleeve is in turn connected by gearing to the crank shaft of the engine.

In accordance with the present invention a clutch of novel construction is positioned coaxially with the transmission main shaft of a power plant of the type described and all details of the clutch are so designed that the clutch as an entirety enters into a most advantageous combination with the other elements of the power plant. Thus the clutch is reduced in size to minimize the overall length of the power plant and its component elements are so formed that the weight of the clutch is reduced as much as possible consistent with the necessary ruggedness and strength. The clutch is also of a type which may be most conveniently actuated by remote control devices, a consideration of much importance when it is kept in mind that the power plant as a whole is one which is adapted to be placed at the rear of a motor vehicle, in which event the control devices at the front of the vehicle, such as the clutch pedal, must be connected to the parts to be operated by motion transmission means either in the nature of mechanical linkages or fluid containing conduits for fluid pressure operation. The clutch contemplated by the present invention is particularly well suited for operation by mechanisms of the distant control type.

In the accompanying drawings one form of the clutch is disclosed by way of example and likewise a power plant of the type with which the clutch may most advantageously be used. It will be appreciated that certain of the novel features of the invention may be employed in clutch mechanisms which differ widely in appearance and likewise that the clutch as an entirety may advantageously be incorporated in power plants the arrangement of the elements of which vary considerably, although its incorporation in a power plant of the type described is particularly advantageous.

In the drawings:

Figure 2 is a longitudinal axial section through the improved clutch; and

Figure 3 is a section on line 3—3 of Figure 2.

Figure 1:
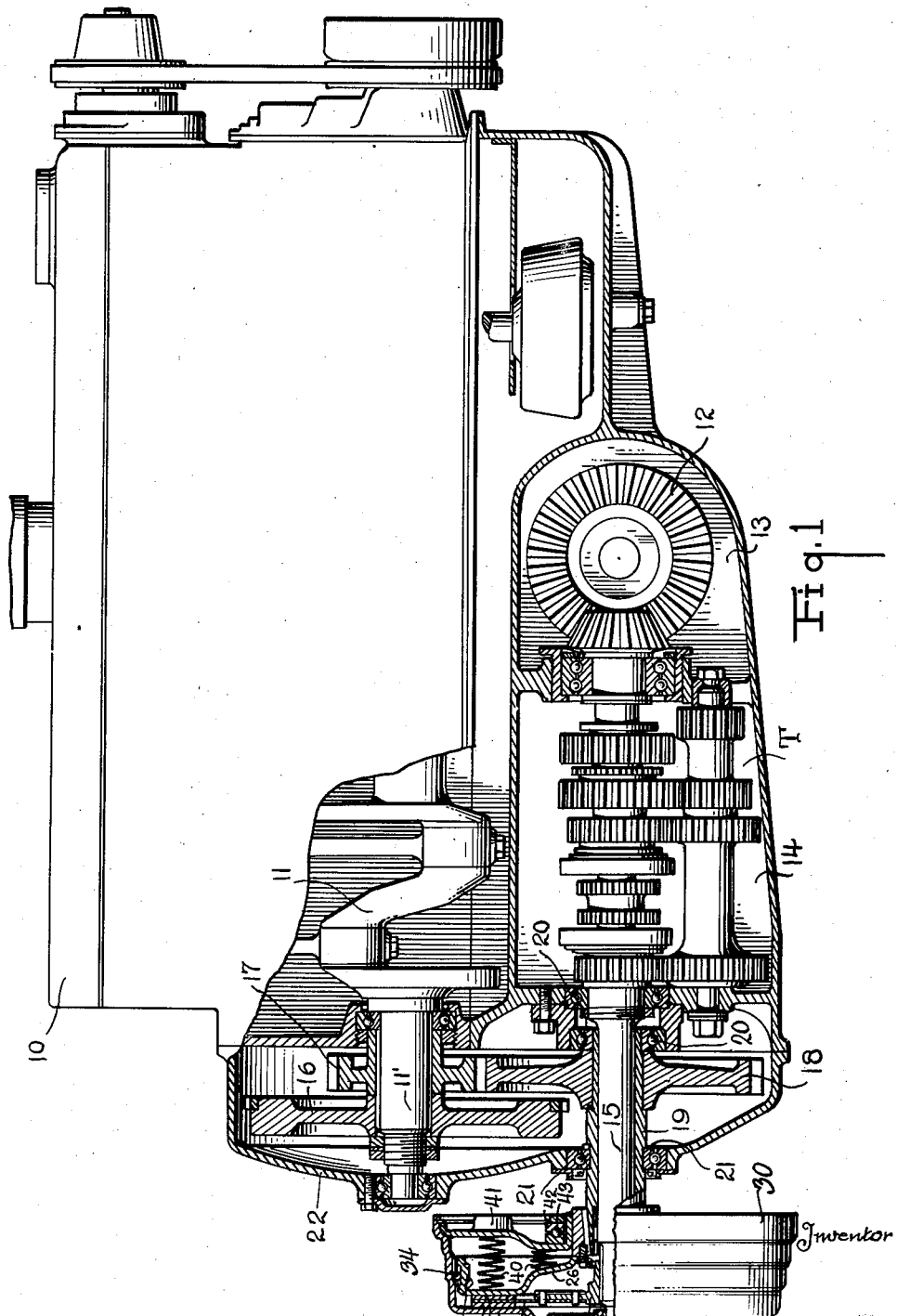
Figure 1 is an illustration, partly in side elevation and partly in axial section, of a motor vehicle power plant of the type in which the engine is positioned in close proximity to the driven axle and in which the novel clutch mechanism is incorporated.

The engine of the power plant is generally indicated at 10 and this engine may advantageously be of the type in which the cylinder axes are vertically disposed and arranged in parallelism in a common vertical plane, the crank shaft 11 then having its longitudinal axis disposed horizontally. It will be appreciated, however, that other types of engines may be employed where thought desirable. The driven axle extends transversely of and is positioned below the axis of the crank shaft 11, the ring gear of a differential mechanism associated with the driven axle being indicated at 12 and being preferably located in a compartment 13 just below the bottom of the crank case of the engine, and preferably integral therewith. In a second compartment 14 immediately adjacent compartment 13 is a transmission mechanism generally indicated at T and the various operating parts of which need not be described as the transmission may be of any conventional or suitable type. The transmission main shaft, however, indicated at 15, projects horizontally through the end wall of the transmission compartment 14 so as to lie below and be disposed in parallelism with the axially projecting end 11' of the crank shaft 11. A flywheel mounted upon the crank shaft end is indicated at 16 and a spur gear also fixed upon the crank shaft end is indicated at 17. The teeth of spur gear 17 mesh with those of a larger spur gear 18 fixed upon a sleeve 19 encircling the transmission main shaft 15, this sleeve being suitably mounted in anti-friction bearings 20 and 21, the outer bearing 21 being supported within a suitable aperture formed within a casing member 22 which encloses the flywheel and the gearing which connects the crank shaft and sleeve 19. It is apparent that rotation of the crank shaft will cause rotation of the sleeve 19, the sleeve, however, rotating at a less speed than the crank shaft due to the fact that the gear 17 is of less diameter than gear 18. The clutch is generally indicated at C and is designed and intended to normally operatively connect, but to disconnect when operated, the sleeve 19 from the transmission main shaft 15, the sleeve 19 being hereinafter designated the drive shaft in the description of the operation of the clutch, and the transmission main shaft 15 being designated the driven shaft.

Fixed upon the outer end of the sleeve 19, or the drive shaft, is the hub 25 of a drum 26, the drum 26 being disposed generally in a plane transverse to the common axis of the driving and driven shafts and being a somewhat cupped member, having a cylindrical peripheral flange-like portion 26'. The drum is preferably fabricated of sheet metal by a pressing operation in order to provide a member of maximum strength for a given weight and is, for this reason, formed separately from the hub 25 and is attached thereto at 27 by welds or in some other suitable manner. The cylindrical outer surface of the peripheral flangelike portion 26' of the drum is provided with elongated grooves 28, closed at their ends and disposed in parallelism to the common axis of the driving and driven members, these grooves either being formed by pressing operations, thus inwardly displacing portions of the metal of the flange 26', or by cutting.

Slidably mounted upon the hub 25 of the drum just described is a sleeve 29 which forms a portion of a two-part housing generally indicated at 30. Housing 30 includes a relatively large one piece deeply cupped member 31 and a disk-like closure 32 for the open end of this member, the periphery of the disk-like closure member 32 being rigidly secured to the edge of housing member 31 by any suitable means and its inner margin being integral with sleeve 29 previously referred to. Housing part 31 is centrally apertured to receive the end of the driven shaft and is slidable on said shaft, a cup-shaped guard G mounted on the housing enclosing the outer end of the shaft. Both parts of the housing 30 are preferably fabricated of sheet metal, being readily shaped by pressing operations. The inner surface of the generally cylindrical portion of the housing is spaced from but is closely adjacent the cylindrical outer surface of the cylindrical flange 26' of the drum and the inner surface of the housing is provided with a plurality of grooves 33, disposed parallel to the common axis of the driving and driven shafts, each of grooves 33 being directly opposed to one of the grooves 28 of the drum. One end of each groove 33 is closed but the other end is open to facilitate assembly of the locking balls or bearings to be described, as shown clearly in Figure 2. Within the recesses defined by the walls of the pairs of registering grooves 28 and 33 of the drum and housing respectively are positioned elements, preferably in the form of roller bearings 34, which serve to lock together or unite the drum 26 and housing member 31 for simultaneous rotation about the axis of the driving and driven shafts but which elements do not oppose limited relative movement of the drum and housing axially of said shafts, such movements being necessary for the accomplishment of the clutching functions of the mechanism, as will be hereinafter more clearly described.

Fixed upon the driven shaft 15 is a hub 35 which rigidly supports a disk 36 disposed at right angles to shaft 15 the outer portions of which disk lie between parallel mutually facing surfaces of the drum and housing, respectively, annular layers of friction material 37 being interposed between the surfaces of the disk and the surfaces of the drum and housing just referred to to insure the development of the necessary frictional forces. Helical springs are indicated at 40, there being a number of these springs circularly arranged about the axis of shaft 15 and disposed parallel to that axis, one end of each spring bearing against drum 26 and the other against plate 32 of the housing 30. Any suitable means may be employed for retaining the springs in the positions in which they are shown but I preferably form cup-shaped depressions 41 in closure plate 32 of the housing for the reception of the inner ends of the springs, and form shallow recesses in the drum for the retention of their outer ends, within which depressions and recesses the springs are securely retained.

Inasmuch as the drum is fixed upon the hollow driving shaft 19, it will be apparent that the drum comprises a stationary abutment for the outer ends of the springs and that the springs will jointly coact to thrust the housing as an entirety to the right (Figure 2) with the result that the friction elements 37, which are secured to the disc 36, are maintained in tight clamping engagement with the opposed faces of the members 26 and 31. Movement of the housing to the right is limited only by contact of the facing of friction material attached thereto with the disk 36 and the clutch thus normally operatively connects the driving and driven shafts.

In order that the clutch may be operated to cause the friction bands 37 to disengage members 26 and 31 a clutch yoke 42 is provided, which yoke may be of any conventional type and may be operated by any convenient means. It rests against the outer race 43 of a ball bearing which encircles sleeve 29 and by the interposition of this circular bearing between the clutch yoke 42 and the housing, axial pressure upon the housing may be exerted by the clutch yoke without retardation of the rotary movement of the housing or the development of friction.

The clutch yoke 42 may conveniently be operated from a distant point by any simple mechanism and it will be perceived that by reason of the novel design of the clutch all operating levers, such as are commonly used in direct combination with the movable clutch parts, are eliminated. The housing obviously performs several functions. It comprises a portion of the clutch actuating means, being movable axially of the driving and driven shafts in one direction by the clutch yoke 42 and in the opposite direction by springs 40. It comprises an enveloping casing maintaining the various operating parts of the clutch entirely free from contact with dust, dirt and water. Again, it comprises a portion of the gripping means of the clutch, cooperating with the drum 26 in gripping or releasing the clutch disk 36. All of the clutch parts are of the simplest form and are easily and cheaply fabricated, the major portions being formed of sheet metal by simple pressing operations so that the clutch as a whole has a maximum strength for a given weight. The arrangement of parts shown likewise results in the formation of a clutch which is of minimum depth, measured axially of the clutch, a substantial advantage when the clutch is made use of in a power plant of the type described.

Having thus described the invention what is claimed as new and desired to be secured by Letters Patent is:

1. In a clutch mechanism, the combination with coaxial driving and driven members mounted for relative rotation but restrained against relative axial movement, of a drum fixed upon one of said members, a disk fixed upon the other member, a housing enclosing the drum and disk and adapted to cooperate with the drum in frictionally gripping the disk, means connecting the housing to the drum for simultaneous rotation therewith about an axis, while permitting the housing to move longitudinally of said axis relatively to the drum, and means for moving the housing.

2. In a clutch mechanism, in combination, coaxial driving and driven members mounted for relative rotation but restrained against relative axial movement, a drum fixed on one of said members, a housing concentric with the drum and connected thereto for revolution therewith by means permitting relative axial movement of the drum and housing, and a disk fixed on the second of said members and extending between the drum and housing to be gripped therebetween.

3. In a clutch mechanism, in combination, coaxial driving and driven members mounted for relative rotation but restrained against relative axial movement, a drum fixed on one of said members, a housing concentric with the drum, means connecting the drum and housing for simultaneous rotation with the drum about the axis thereof, said means permitting relative axial movement of the drum and housing, a disk fixed on the second of said members and extending between parallel mutually facing surfaces of the drum and housing, and means resiliently urging the drum and housing to mutually grip said disk.

4. In a clutch mechanism, in combination, coaxial driving and driven members, a disk fixed on one of said members, and disk gripping means carried by the second member, said means including a drum and housing, said drum and housing being relatively movable axially of said members, the drum and housing having mutually facing grooves disposed parallel to the axis of said members, and means within said grooves constraining the drum and housing to rotate simultaneously while permitting relative axial movement thereof, said means being unattached to the either the drum or housing and wholly retained by the grooves.

5. In a clutch mechanism, in combination, coaxial driving and driven members, a disk fixed on one of said members, and disk gripping means carried by the second member, said means including a drum and housing, said drum and housing being relatively movable axially of said members, the drum and housing having mutually facing grooves disposed parallel to the axis of said members, and balls within said grooves constraining the drum and housing to rotate simultaneously while permitting relative axial movement thereof.

6. In a clutch mechanism, in combination, coaxial driving and driven members, a disk fixed on one of said members, and disk gripping means carried by the second member, said means including a drum and housing, said housing being axially slidable relatively to the drum and being supported upon the periphery of the drum by means permitting such axial movement of the housing but constraining the housing to rotate with the drum about the axis of said members, said means being unattached to either drum or housing.

7. In a clutch mechanism, in combination, coaxial driving and driven members, a disk fixed on one of said members, and disk gripping means carried by the second member, said means including a drum having a cylindrical peripheral portion provided with external grooves disposed parallel to the axis of said members, and a housing having a cylindrical portion closely enveloping the peripheral portion of the drum, the inner surface of said cylindrical portion of the housing being provided with grooves paralleling the axis of said members and registering respectively with the grooves in said drum, and a ball bearing within each space defined by the walls of a pair of registering grooves to unite said drum and housing for simultaneous rotation, while permitting relative axial movement.

8. In a clutch, in combination, coaxial driving and driven shafts, one of said shafts being hollow and encircling the other, interengageable clutch members mounted on and rotatable with said shafts, respectively; one of said members being secured against movement axially of the shaft upon which it is mounted, and a housing movable axially of said shafts, said housing being slidably mounted on that clutch member which is fixed against axial movement upon its supporting shaft and also upon the other shaft, said housing enclosing both clutch members and having a surface to contact with one of them.

9. In a clutch, in combination, coaxial driving and driven shafts, one of said shafts being hollow and encircling the other, interengageable clutch members mounted on and rotatable with said shafts, respectively, one of said members being secured against movement axially of the shaft upon which it is mounted, and a housing movable axially of said shafts, said housing being slidably mounted on that clutch member which is fixed against axial movement upon its supporting shaft and also upon the other shaft, said housing enclosing both clutch members and having a surface to contact with one of them, said housing also being connected to the clutch member upon which it is slidably mounted, so as to revolve therewith.

FRANK C. BEST.